UNITED STATES PATENT OFFICE.

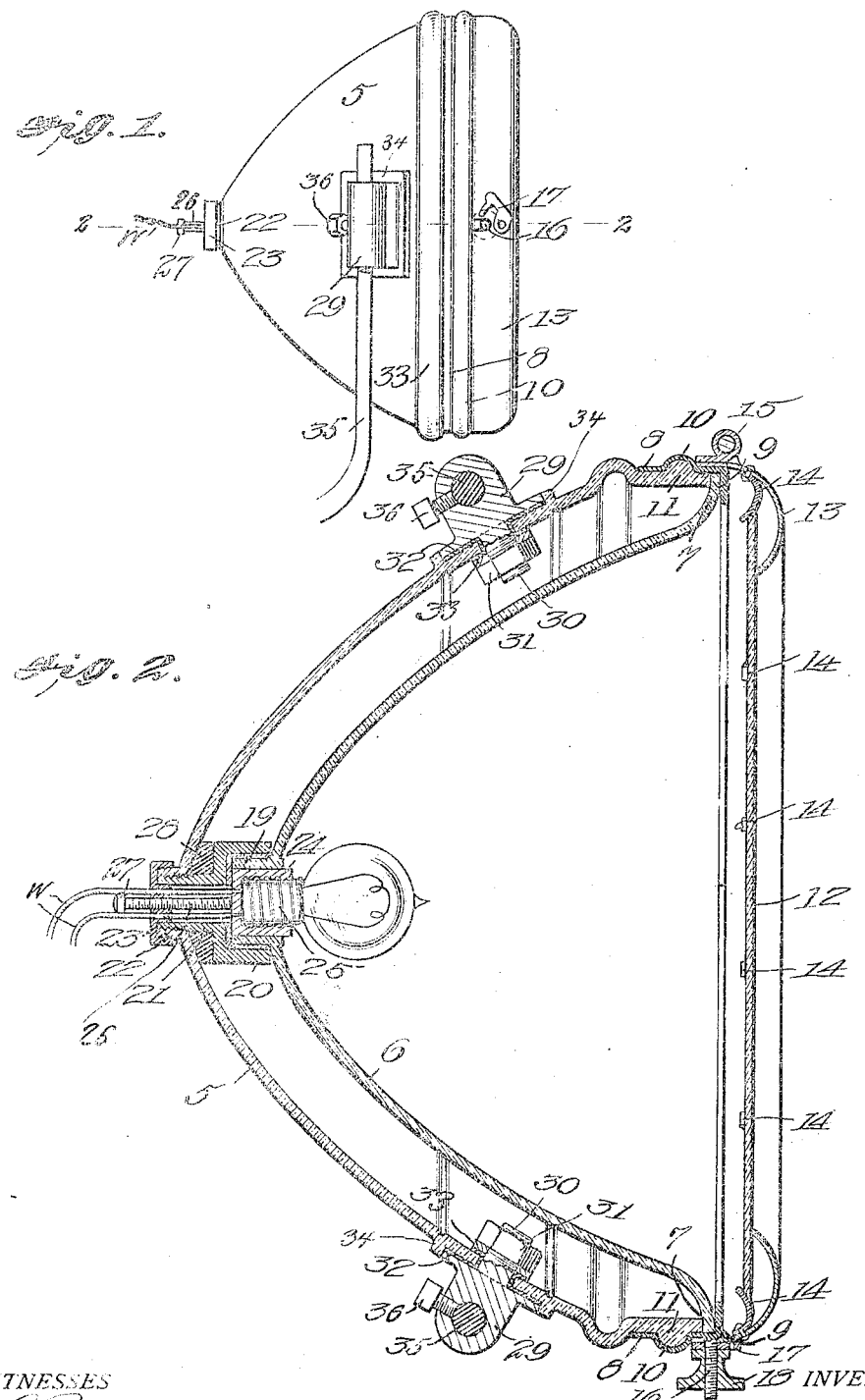

EDGAR J. LUTWYCHE, OF CHICAGO, ILLINOIS.

LAMP.

1,070,383.

Specification of Letters Patent. Patented Aug. 12, 1913.

Application filed October 21, 1912. Serial No. 726,277. REISSUED

*To all whom it may concern:*

Be it known that I, EDGAR J. LUTWYCHE, a citizen of the United States, residing at Chicago, in the county of Cook and State of Illinois, have invented certain new and useful Improvements in Lamps, of which the following is a specification.

This invention relates to that class of lamps which are used in connection with automobiles and other motor vehicles, a lamp of this kind being disclosed and claimed in my Patent No. 1,022,589, dated April 9, 1912, and the present invention being an improvement thereof.

It is the object of the invention to provide a novel construction and assemblage of parts whereby a more rigid and durable lamp is had, and also to provide a structure which permits ready removal of the lens, and adjustment of all of the parts of the lamp.

The invention also has for its object to provide novel means for securing the lamp to a supporting bracket.

In order that the invention may be better understood, reference is had to the accompanying drawing, in which—

Figure 1 is an elevation of the lamp, and Fig. 2 is an enlarged horizontal section on the line 2—2 of Fig. 1.

As in my patent hereinbefore referred to, the casing 5 of the lamp is made of glass and is in one piece. Within the casing is mounted a parabolic reflector 6 having at its forward end or periphery a curved rim 7 which abuts against the corresponding open end of the casing. Around the abutting parts fits a ring which is angular in cross-section. One of the parts 8 of the ring fits on the outside of the casing 5 and extends across the joint between the same and the rim 7, and the other part 9 of the ring extends around in front of said rim. The part 8 of the ring has a bead 10 forming a channel in which seats a bead 11 formed on the outer surface of the casing, said channel and bead serving to hold the ring in place on the casing.

The front of the casing is closed by a glass 12 carried by a hinged frame consisting of a ring 13 to which are soldered or otherwise secured retaining fingers 14 which grip the glass near its periphery and hold the same securely to the ring. The ring 13 is connected by a hinge 15 to the part 8 of the ring hereinbefore described, and said part, diametrically opposite the hinge, also carries an outstanding screw-threaded stem 16 which is adapted to be engaged by a pivoted latch-hook 17 carried by the ring 13. A nut 18 screwed on the stem, over the latch-hook, prevents disengagement of the latter. Upon unscrewing the nut, the latch can be slipped off the stem, and the glass can then be swung open. The hinge 15 may be soldered on the part 8.

The center or inner end of the reflector 6 has a reduced neck 19 which is cemented into a brass sleeve 20 having a rearwardly extending reduced portion 21 which is screw-threaded externally. The rear portion of the casing 5 terminates in a reduced neck 22 into which the part 21 is screwed. By this assemblage of parts the reflector and the casing may be brought together until the rim 7 abuts against the edge of the casing as hereinbefore described. A small cap 23 is screwed on the neck 22 over the outer end of the latter and the part 21.

In the neck 19 of the reflector 6 is slidably mounted a socket-piece 24 into which the lamp base 25 screws. From the back of the socket-piece extends a stem 26 which passes through the part 21 and is threaded to screw through the back of the cap 23 which is thickened to provide sufficient metal for the threaded aperture through which the stem passes. At the outer end of the stem is a head 27 which serves as a finger hold. The purpose of the stem is to adjust the socket-piece 24 lengthwise in the sleeve 20, which is readily done by rotating the stem. The cap 23 and the back of the socket-piece 24 are also apertured for the current wires W of the lamp.

To prevent the part 21 and the back of the part 20 from coming in contact with the casing, a rubber gasket 28 is interposed therebetween.

At diametrically opposite points, the casing 5 carries a device for mounting the lamp on a bracket. Each of these devices comprises a socket-piece 29 having a stem 30 which passes through an aperture in the casing 5. That end of the stem which projects into the casing is threaded to receive a nut 31. The aperture in the casing through which the stem passes is lined with a rubber bushing 32, which latter also extends between the base of the socket-piece and the outer surface of the casing, and between the inner surface of the casing and a fiber washer 33 mounted on the projecting end of the stem. The nut 31 is screwed against this washer. The outer surface of the casing has a bead 34 which surrounds the base of the socket-piece and thus forms a seat therefor.

By the devices herein described the socket-pieces 29 are rigidly fastened to the casing 5 and there is no danger of injury to the latter. The stems 35 of the lamp bracket are secured in the socket-pieces by set screws 36.

I claim:—

1. A lamp comprising a casing having at its rear end a reduced neck, a reflector in the casing and having a peripheral rim abutting against the forward end of the casing, and said reflector also having a central reduced neck, and a sleeve in which the last mentioned neck is secured, said sleeve having an adjustable connection with the neck of the casing.

2. A lamp comprising a casing having at its rear end a reduced neck, a reflector in the casing and having a peripheral rim abutting against the forward end of the casing, and said reflector also having a central reduced neck, and a sleeve in which the last mentioned neck is secured, said sleeve having a reduced threaded portion which screws into the neck of the casing.

3. A lamp comprising a casing having at its rear end a reduced neck, a reflector in the casing and having a peripheral rim abutting against the forward end of the casing, and said reflector also having a central reduced neck, a sleeve in which the last mentioned neck is secured, said sleeve having an adjustable connection with the neck of the casing, a socket-piece mounted in the neck of the reflector, and a source of light mounted in the socket-piece.

4. A lamp comprising a casing having at its rear end a reduced neck, a reflector in the casing and having a peripheral rim abutting against the forward end of the casing, and said reflector also having a central reduced neck, a sleeve in which the last mentioned neck is secured, said sleeve having an adjustable connection with the neck of the casing, a socket-piece mounted in the neck of the reflector and adjustable lengthwise therein, and a source of light mounted in the socket-piece.

5. A lamp comprising a casing having at its rear end a reduced neck, a reflector in the casing and having a peripheral rim abutting against the forward end of the casing, and said reflector also having a central reduced neck, a sleeve in which the last mentioned neck is secured, said sleeve being connected to the neck of the casing, a cap over the outer end of the sleeve and the neck of the casing, a socket-piece mounted in the neck of the reflector, a stem extending from the socket-piece and screwing through the cap, and a source of light in the socket-piece.

6. A lamp comprising a casing, a reflector in the casing and having a peripheral rim abutting against the forward end of the casing, and a support connected to the reflector and having a screw-threaded engagement with the casing for drawing said reflector rim and the forward end of the casing together.

7. A lamp casing having an aperture, a socket-piece having a threaded stem extending through the aperture and projecting into the casing, the outer surface of the casing having a bead which extends around the base of the socket-piece, and a nut screwed on the projecting end of the stem.

8. A lamp casing having an aperture, a socket-piece having a threaded stem extending through the aperture and projecting into the casing, the outer surface of the casing having a bead which extends around the base of the socket-piece, a nut screwed on the projecting end of the stem, a washer under the nut, and a bushing in the aperture between the outer surface of the casing and the base of the socket-piece, and between the inner surface of the casing and the washer.

9. A lamp comprising a casing, a reflector in the casing and having a peripheral rim abutting against the forward end of the casing, and a ring overlapping the joint between said rim and the casing, and having a portion which extends in front of the rim into engagement therewith.

In testimony whereof I affix my signature in presence of two witnesses.

EDGAR J. LUTWYCHE.

Witnesses:
S. J. LEHRER,
H. G. BATCHELOR.